United States Patent [19]

Koch

[11] Patent Number: 5,356,994
[45] Date of Patent: Oct. 18, 1994

[54] ADHESIVE/SEALANT COMPOSITION COMPRISING A RUBBER COMPONENT

[75] Inventor: Markus Koch, Bad Homburg, Fed. Rep. of Germany

[73] Assignee: Bostik, Inc., Middleton, Mass.

[21] Appl. No.: 909,786

[22] Filed: Jul. 7, 1992

[30] Foreign Application Priority Data

Jul. 10, 1991 [DE] Fed. Rep. of Germany ....... 4122849

[51] Int. Cl.⁵ .................... C08L 9/00; C08L 47/00; C08L 53/00
[52] U.S. Cl. .............................. 525/98; 524/517; 524/522; 525/99; 525/207; 525/221
[58] Field of Search ............... 524/522, 517; 525/98, 525/99, 207, 221

[56] References Cited

U.S. PATENT DOCUMENTS

| | | | |
|---|---|---|---|
| 3,925,272 | 12/1975 | Ibata et al. | 260/4 |
| 4,451,615 | 5/1984 | Charnock | 525/98 |
| 4,600,745 | 7/1986 | Creighton | 524/534 |
| 4,824,512 | 4/1989 | Kohlstadt | 156/334 |

FOREIGN PATENT DOCUMENTS

1248271  1/1989  Canada.

*Primary Examiner*—Paul R. Michl
*Assistant Examiner*—U. K. Rauguru
*Attorney, Agent, or Firm*—David G. Conlin; Peter F. Corless

[57] ABSTRACT

A hot-vulcanizable, pumpable rubber-based adhesive/sealant where the rubber component is a mixture of butadiene solid rubber and butadiene or isoprene liquid rubber, and wherein the liquid rubber comprises carboxylic acid groups. The adhesive/sealant compositions of the invention are particularly useful for bonding metal sheeting in the construction of automobile shells.

22 Claims, No Drawings

ADHESIVE/SEALANT COMPOSITION COMPRISING A RUBBER COMPONENT

BACKGROUND OF THE INVENTION

The present invention relates to a hot-vulcanisable, pumpable rubber-based adhesive/sealant suitable for bonding metal sheeting in the construction of automobile shells.

The bonding of metal sheeting in the construction of automobile shells has the objective of sealing cavities and suppressing any vibration which occur. The sheeting used is coated with a number of grams of corrosion-protection oils and drawing oils per square meter, and should be able to absorb these oils. In order to simplify processing and to improve oil absorption, the adhesive/sealant is pumped at temperatures of from about 50° to 80° C. and applied to one side of the sheeting to be bonded. The second sheet is then pressed against the first sheet. It should also be ensured here that the second sheet is not applied until the adhesive/sealant applied has cooled and that, nevertheless, good oil absorption and adhesion are achieved. The adhesive/sealant must be stable for a relatively long time at the processing temperatures. Curing should not take place at temperatures below from about 150° to 200° C., as are usual in the baking ovens used in automobile production.

For the above-mentioned purpose, the use of solvent-free, pumpable, rubber-based adhesives/sealant is known, for example in EP-A-0 097 394, where the rubber component comprises a liquid polybutadiene, to which small amounts of solid polybutadiene can be admixed. However, such adhesives/sealants do not achieve the good adhesion required in automobile production. As used herein, the term "pumpable" refers to a composition that may be pumped, by means of conventional pumps for hot-melt substances, at elevated temperatures such as about 60° C.

EP-A-0 256 316 describes adhesives/sealants having a rubber component comprising polybutadiene liquid rubber and chemically depolymerised solid rubber. The depolymerisation of the solid rubber is said to give better rheological properties. On the other hand, depolymerisation of the solid rubber has the disadvantage of an additional process step.

DE-A-38 34 818 describes an adhesive/sealant whose rubber component comprises polybutadiene liquid rubber containing terminal hydroxyl groups and cis-1,4-polybutadiene solid rubber.

DE-A 27 58 222 discloses pressure-sensitive adhesives for self-adhesive tapes containing tackifying resins, for example polyterpenes or polybutene, and a maleic anhydride-modified liquid polybutadiene. Curing is carried out at room temperature by means of polyamines or poly-epoxides.

Finally, EP-A 0 181 441 discloses cold-curing sealants/adhesives which contain, as binders, hydroxyl-containing homopolymers or copolymers of 1,3-butadiene which carry lateral succinic anhydride groups. Curing is carried out using organic nitrogen bases selected from amines and N-alkylimidazoles.

SUMMARY OF THE INVENTION

Against the background of the abovementioned prior art, the object of the invention is now to provide a hot-vulcanisable, pumpable adhesive/sealant for bonding metal sheeting in the construction of automobile shells which has improved overall properties.

This object is achieved by an adhesive/sealant, where the rubber component is a mixture of butadiene solid rubber and butadiene or isoprene liquid rubber, characterised in that the liquid rubber contains carboxylic acid groups.

The butadiene or isoprene liquid rubber, also referred to below as polybutadiene oil or polyisoprene oil, present in the adhesive/sealant according to the invention contains carboxylic acid groups, which are preferably in the form of carboxylic anhydride. Although the use of a polybutadiene liquid rubber modified in this way is already known from the sealants/adhesives of DE-A 27 58 222 and EP-A 0 181 441 mentioned above, these are cold-curing systems, where curing takes place by reaction of carboxylic acid groups with polyamines. By contrast, the adhesive/sealant of the invention is a hot-vulcanisable system, where vulcanisation or crosslinking takes place by the reaction of the double bonds of butadiene or isoprene, for example by means of a sulphur/accelerator system, or by means of free-radical initiators, preferably peroxides.

DETAILED DESCRIPTION OF THE INVENTION

The carboxylic acid-modified butadiene or isoprene liquid rubbers used according to the invention have a molecular weight $M_n$ of from about 500 to 20,000, preferably from about 1,000 to 10,000 and more preferably from about 1,500 to 5,000 and preferably have a viscosity at 20° C. of from 1 to 250 Pa.s.

In order to achieve low viscosity and good adhesion, it is advantageous to employ liquid rubbers having a high content of cis-1,4 double bonds, preferably more than about 70 mole percent of cis-1,4 double bonds, based on the total double bonds of the molecule, and having not more than about 2 mole percent of vinyl double bonds, based on the total double bonds of the molecule. The term vinyl double bond refers to to a unit of a liquid rubber molecule which is polymerized through the double bond in the 1-position, resulting in a vinyl double bond attached to the polymer backbone. Thus, a vinyl double bond refers to a 1,2-polymerized butadiene in a polybutadiene liquid rubber molecule. The polybutadiene of the following formula (I) illustrates such groups, where the unit [x] depicts a cis-1,4 double bond, the unit [y] depicts a trans-1,4 double bond, and the unit [z] depicts a vinyl double bond.

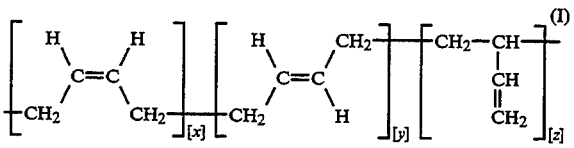

The carboxylic acid groups of butadiene or isoprene liquid rubber generally contain from 3 to 10, preferably 4 to 6, carbon atoms and are derived, for example, from acrylic acid, methacrylic acid, maleic acid, fumaric acid, citraconic acid, itaconic acid or the anhydrides thereof, so long as the acids are able to form anhydrides. They are randomly distributed over the polymer molecule, each polymer molecule containing from 1 to 10, preferably from 2 to 6, carboxylic acid groups or from 1 to 6, preferably from 1 to 3, carboxylic anhydride groups.

In a particular embodiment, the adhesives/sealants of the invention may also contain, in addition to the carboxylic acid-modified liquid rubber, a non-modified liquid rubber, provided that a 50/50 weight ratio should not be exceeded. However, since the desired good adhesion properties fall off with decreasing amounts of carboxylic acid-modified liquid rubber, this embodiment is less preferred.

The butadiene solid rubber is suitably either polybutadiene or a butadiene-styrene rubber having a molecular weight $M_n$ of from about 50,000 to 500,000, preferably from about 80,000 to 200,000. The polybutadiene contains predominantly cis-1,4 double bonds, preferably at least about 95 mole percent of cis-1,4 double bonds, based on the total double bonds of the molecule. The styrene-butadiene solid rubber is a random copolymer containing from about 15 to 25 mole percent of styrene.

The adhesives/sealants of the invention may contain conventional fillers, other additives and processing assistants in conventional amounts.

Examples of suitable fillers are coated calcium carbonate, calcium oxide and carbon black. It is particularly preferred to use a mixture of these three fillers which contains from about 23 to 70% by weight, preferably from about 30 to 60% by weight and in particular from about 50 to 60% by weight, of coated calcium carbonate, from about 1 to 5% by weight, preferably from about 2 to 5% by weight and in particular from about 3 to 5% by weight, of calcium oxide and from about 1 to 10% by weight, preferably from about 1 to 5% by weight and in particular from about 3 to 5% by weight, of carbon black.

Conventional plasticisers may also be used; it is preferred to use paraffinic, aromatic or in particular naphthenic oils.

It is also possible for the adhesive/sealant of the invention to contain adhesion promoters so long as these do not undergo chemical reactions with the other components of the composition. Examples of suitable adhesion promoters are phenolic resins and silanes.

The adhesives/sealants according to the invention are cured by hot vulcanisation at baking temperatures of, for example, from about 150° to 200° C. which are conventional in the construction of automobile shells; it is preferred to use a sulphur/accelerator vulcanisation system, but it is also possible to use free-radical initiators.

Examples of suitable accelerators are benzothiazoles, thiurams, dithiocarbamates, thioureas or mixtures thereof. Benzothiazoles, for example dibenzothiazole disulphide, are preferred.

Examples of suitable thermal free-radical initiators are organic peroxides, in particular those having high decomposition temperatures. Preferred examples are dicumyl peroxide and 2,5-dimethyl-2,5-bis (t-butyl-peroxy) hexane.

Table I below shows the composition of some typical adhesives/sealants according to the invention wherein amounts are expressed as percents by weight of the mixture.

All documents mentioned herein are incorporated herein by reference.

The following examples illustrate the invention without limitation.

The compositions are prepared in a Pfleiderer compounder. First, the butadiene solid rubber is kneaded with the fillers, the oxidation stabiliser and the plasticiser until the mixture is homogeneous, the carboxylic acid-modified liquid rubber is then added, and finally the vulcanisation chemicals (zinc oxide, sulphur, accelerator and aliphatic carboxylic acid) are incorporated into the composition with cooling.

Oiled steel is used to test the adhesives/sealants.

For processing the adhesive/sealant is first warmed to a temperature of 60° C. and then applied to the oiled steel sheeting in a bead thickness of 4 mm. The second sheet is pressed on, the adhesive/sealant bead is compressed to a layer thickness of 2 mm, and curing is carried out for 30 minutes at a temperature of 180° C. After cooling, the shear strength is measured in accordance with DIN 53281 on a bonded area of 2.5×0.2 cm and the T-peel is measured in accordance with DIN 53283 on a bonded area of 2.5×7.5×0.2 cm. The failure mechanism is assessed visually as follows:

C=cohesive
C/A=predominantly cohesive, partly adhesive
A/C=predominantly adhesive, partly cohesive The results are shown in Table II, the following starting materials being used:

Maleic Anhydride-Modified Polybutadiene Oil 1

Molecular weight $M_n$ 1,700
Viscosity 6 Pa.s. (at 20° C.)
1.1 Anhydride groups per molecule
more than 70 mole percent of cis-1,4 double bonds (based on total double bonds of molecule), less than 2 mole percent of vinyl double bonds (based on total double bonds of molecule).

Maleic Anhydride-modified polybutadiene oil 2

Molecular weight $M_n$ 1,700
Viscosity 220 Pa.s. (at 20° C.)
2.3 Anhydride groups per molecule
more than 70 mole percent of cis-1,4 double bonds (based on total double bonds of molecule), less than 2 mole percent of vinyl double bonds (based on total double bonds of molecule).

Polybutadiene oil

Molecular weight $M_n$ 3,000
Viscosity 3 Pa.s. (at 20° C.)
75 mole percent of cis-1,4 double bonds (based on total double bonds of molecule), 1 mole percent of vinyl double bonds (based on total double bonds of molecule), and 24 mole percent of trans-1,4 double bonds (based on total double bonds of molecule).

Hydroxyl-Modified Polybutadiene Oil

Molecular weight $M_n$ 2,800
Viscosity 4 Pa.s. (at 20° C.)
2.4 OH groups per molecule
60 mole percent of trans-1,4 double bonds (based on total double bonds of molecule), 20 mole percent of cis-1,4 double bonds (based on total double bonds of molecule), 20 mole percent of vinyl double bonds (based on total double bonds of molecule).

Butadiene Solid Rubber

Molecular weight $M_n$ 95,000
Mooney viscosity ML (1+4) at 100° C.: 46
95 mole percent of cis-1,4 double bonds (based on total double bonds of molecule) and 3 mole percent trans-1,4 double bonds (based on total double bonds of molecule), 2 mole percent vinyl double bonds (based on total double bonds of molecule).

Butadiene-Styrene Solid Rubber

Molecular weight $M_n$ 100,000
Mooney viscosity ML (1+4) at 100° C.: 50
Styrene content 23.5 mole percent Vulcanisation Accelerator Dibenzothiazole disulphite Aliphatic Carboxylic Acid Stearic acid Oxidation stabiliser Octadecyl 3-(3,5-di-ter.butyl-1,4-hydroxyphenyl)-propionate

TABLE I

| Constituent | % by weight | | |
|---|---|---|---|
| | General | Preferred | Particularly preferred |
| Liquid rubber containing carboxylic acid groups | 8 to 30 | 10 to 20 | 12 to 18 |
| Butadiene solid rubber | 1 to 20 | 1 to 15 | 2 to 10 |
| Fillers | 25 to 75 | 40 to 70 | 50 to 70 |
| Plasticisers | 0 to 20 | 4 to 15 | 6 to 10 |
| Adhesion promoters | 0 to 10 | 0 to 8 | 0 to 5 |
| Oxidation stabilisers | 0 to 2 | 0.5 to 2 | 0.5 to 1 |
| Sulphur | 1 to 10 | 1 to 5 | 1 to 3 |
| Vulcanisation Accelerator | 0.5 to 5 | 0.5 to 3 | 0.5 to 2 |
| Aliphatic carboxylic acid | 0 to 1 | 0.2 to 0.8 | 0.2 to 0.5 |
| Zinc oxide or | 2 to 10 | 2 to 8 | 2 to 5 |
| Free-radical initiators | 0.05 to 3 | 0.05 to 2 | 0.1 to 1 |
| Zinc oxide | 0 to 10 | 2 to 8 | 2 to 4 |

TABLE II

| Constituents, % by weight | 1 | 2 | 3 | 4 | Comp (Ger. Pat. No. 38 34 818) |
|---|---|---|---|---|---|
| Maleic anhydride-modified polybutadiene oil 1 | 12.0 | 12.0 | — | 15.0 | — |
| Maleic anhydride-modified polybutadiene oil 2 | — | — | 6.0 | — | — |
| Polybutadiene oil | — | — | 6.0 | — | — |
| Hydroxyl-modified polybutadiene oil | — | — | — | — | 12.0 |
| Butadiene solid rubber | 5.0 | — | 5.0 | 10.0 | 5.0 |
| Butadiene-styrene solid rubber | — | 5.0 | — | — | — |
| Plasticiser | 10.0 | 10.0 | 10.0 | 6.0 | 10.0 |
| Chalk | 55.0 | 55.0 | 55.0 | 50.0 | 55.0 |
| Carbon black | 5.0 | 5.0 | 5.0 | 5.0 | 5.0 |
| Calcium oxide | 5.0 | 5.0 | 5.0 | 5.0 | 5.0 |
| Oxidation stabiliser | 0.8 | 0.8 | 0.8 | 0.8 | 0.8 |
| Sulphur | 2.0 | 2.0 | 2.0 | 2.0 | 2.0 |
| Vulcanisation accelerator | 0.8 | 0.8 | 0.8 | 0.8 | 0.8 |
| Zinc oxide | 4.0 | 4.0 | 4.0 | 4.0 | 4.0 |
| Aliphatic carboxylic acid | 0.4 | 0.4 | 0.4 | 0.4 | 0.4 |
| Properties: | | | | | |
| Shear strength [N/mm²], oiled steel | 1.3 | 1.3 | 1.3 | 1.9 | 0.9 |
| Failure mechanism | C | C | C/A | C | A/C |
| T-peel, oiled steel [N/25 mm] | 148/48 | 143/62 | 129/52 | 200/50 | 122/48 |
| commencement of cracking/mean force | | | | | |
| Failure mechanism | C | C | C/A | C | A/C |

What is claimed is:

1. A hot-vulcanisable adhesive/sealant composition comprising a rubber component and a vulcanisation system, the rubber component comprising a mixture of a butadiene solid rubber and a butadiene or isoprene liquid rubber, and wherein the liquid rubber comprises carboxylic acid groups.

2. The composition of claim 1 where the carboxylic acid groups in the liquid rubber are in the anhydride form.

3. The composition of claim 1 where that the liquid rubber has a molecular weight $M_n$ of from about 1,000 to 10,000.

4. The composition of claim 1 where the liquid rubber is a butadiene liquid rubber.

5. The composition of claim 4 where the butadiene liquid rubber contains maleic anhydride groups.

6. The composition of claim 1 where the liquid rubber has greater than about 70 mole percent cis-1,4 double bonds, based on the total amount of double bonds of the liquid rubber.

7. The composition of claim 6 where the liquid rubber has not more than about two mole percent of vinyl double bonds.

8. The composition of claim 1 where each liquid rubber molecule contains from 1 to 3 carboxylic anhydride groups.

9. The composition of claim 1 where the liquid rubber molecule contains from 2 to 6 carboxylic acid groups.

10. The composition of claim 1 where the liquid rubber is present in an amount of from about 10 to 20 percent by weight of the mixture.

11. The composition of claim 1 where the butadiene solid rubber has a molecular weight $M_n$ of from about 50,000 to 500,000.

12. The composition of claim 1 further comprising a liquid rubber essentially free of carboxylic acid groups.

13. The composition of claim 1 where the vulcanisation system is selected from the group consisting of (1) a system comprising sulphur and a vulcanisation accelerator, and (2) a system comprising a free-radical initiator.

14. A process for bonding metal sheeting, comprising applying a hot-vulcanisable adhesive/sealant composition to a first sheet substrate, the adhesive/sealant composition comprising a rubber component and a vulcanisation system, the rubber component comprising a mixture of a butadiene solid rubber and a butadiene or isoprene liquid rubber wherein the liquid rubber comprises carboxylic acid groups.

15. The process of claim 14 where the adhesive/sealant composition is applied to the first sheet substrate by pumping the adhesive/sealant composition at an elevated temperature.

16. The process of claim 14 further comprising applying a second sheet substrate over the adhesive/sealant composition on the first sheet substrate.

17. The process of claim 16 where the first and second sheet substrates are metal sheeting suitable for use in the construction of automobile shells.

18. The process of claim 14 further comprising curing the adhesive/sealant composition by hot vulcanisation.

19. The process of claim 18 wherein the vulcanisation is conducted at a baking temperature of from about 150° to 180° C.

20. The composition of claim 1 where the carboxylic acid groups of the liquid rubber are randomly distributed over the polymer molecule.

21. The composition of claim 1 where the composition consists essentially of the rubber component and a vulcanisation system.

22. The process of claim 14 consisting essentially of applying the composition to the first sheet substrate and then applying a second sheet substrate over the composition.

* * * * *